2,813,841
ALKYD RESIN COMPRISING TALL OIL AND PENTAERYTHRITOL

John A. Parker, Lancaster Township, Lancaster County, and Ernest J. Pieper, Lancaster, Pa., assignors to Armstrong Cork Company, Lancaster, Pa., a corporation of Pennsylvania No Drawing. Application January 31, 1955,
Serial No. 485,298

8 Claims. (Cl. 260—22)

This invention relates to a modified alkyd resin and, more particularly, to a modified alkyd resin peculiarly adapted to serve as a felt saturant. Still more particularly, the invention relates to a modified alkyd resin wherein tall oil is the principal ingredient.

Felt saturants most widely used in the past have been of the so-called oleoresinous type. These oleoresinous saturants generally comprise mixtures of drying oils with rosin and drying catalysts. The wide use of these oleoresinous saturants attests to their practicality.

Yet the known oleoresinous saturants suffer from one serious shortcoming. After having been placed on a felt to the extent of 30% to 45% by weight of the felt, the saturated felt must next be cured as, for example, by stoving for the requisite period of time at a temperature of about 180° F. The curing cycle of the oleoresinous saturants entails exothermic reactions, and so it has been necessary to cure saturated felts at temperatures lower than desirable over longer periods of time. Thus a suitable saturant allowing the production of a saturated felt possessing all the properties of an oleoresinous saturated felt and yet having a markedly reduced curing cycle would be a highly desirable product.

It is the primary object of the present invention to supply such a product. It is a further object to supply a felt saturant from which may be produced a saturated felt product meeting the stringent requirements of such physical properties as flexibility, tensile strength, acid and alkali resistance, and lack of staining on any of the usual coatings that may be applied thereon.

These objects have been accomplished in a surprisingly effective manner. The saturant is prepared by reacting a mixture of tall oil, dimerized acids, and a polyhydroxy alcohol containing at least one ether linkage to produce a product having an acid number in the range of about 140–160. This product is then reacted with pentaerythritol to produce an alkyd resin having an acid number in the range of about 15–25. The alkyd resin is then reacted with an enedioic dicarboxylic acid, or the lower alkyl esters thereof, or the anhydrides thereof to produce a modified alkyd resin saturant having an acid number in the range of about 20–30. In order that the final product possess the necessary physical characteristics, the reactants must be present in the following percentages by weight:

Acid constituents: | Percent
--- | ---
Tall oil | 80–90
Dimerized acid | 15–8
Dicarboxylic acid | 5–2
Alcohol constituents: |
Polyhydroxy alcohol | 10–20
Pentaerythritol | 90–80

The ratio of the weight of the above alcohol constituents to the weight of the above acid constituents is such that there are substantially equal quantities of hydroxyl and carboxyl groups; as a practical matter in accordance with good alkyd resin practice, the hydroxyl groups will be slightly in excess of the acid groups.

The constituent occurring in the largest amount in the product of the present invention is tall oil. Tall oil is a by-product of the manufacture of kraft paper by the sulfate process from pine or fir wood and is generally considered to be a mixture of fatty acids, rosin acids, and unsaponifiable materials. Generally speaking, a typical crude tall oil contains about 35% to 50% rosin acids, about 40% to 50% fatty acids, and about 5% to 10% sterols, and other unsaponifiables. Of the fatty acid fraction, saturated acids may comprise about 6% to 8% of the total, oleic acid about 44% to 52%, and linoleic acid about 45% to 50%. Crude tall oil is preferred in the present invention, since part of the properties of the product come from esterification of substantial amounts of rosin acids.

The dimerized acids to be used in the present process are known items of commerce and are prepared by the thermal polymerization of drying oils under pressure and in the presence of water (steam). They comprise mainly dilinoleic acid, which is a 36-carbon unsaturated dibasic acid. The dimerized acids may be purchased on the market under the name Empol 1022.

The polyhydroxy alcohols containing at least one ether linkage are such well-known compounds as diethylene glycol, polypropylene glycol 200, polyethylene glycol 200, and triethylene glycol. It is essential that the polyhydroxy alcohol contain at least one ether linkage in order that the final product may be sufficiently flexible for the described use.

The first step of the process comprises reacting the tall oil, the dimerized acid, and the polyhydroxy alcohol containing at least one ether linkage. This may be readily accomplished by simply charging the mixture to a kettle such as an alkyd reactor and heating the batch to the requisite temperature. It is preferred that the temperature be raised slowly under a blanket of inert gas until a temperature in the range of about 180°–220° C. is obtained. The batch is maintained at that temperature until an acid number in the range of about 140–160 is obtained. The relative amounts of the tall oil, the dimerized acid, and the polyhydroxy alcohol will be discussed subsequently.

Once the proper acid number of 140–160 is reached, the requisite amount of pentaerythritol is added. The addition is preferably carried out slowly in order that the batch temperature does not fall appreciably below that at which the acid number of 140–160 was obtained. Along with the pentaerythritol there may be added an esterification catalyst, as for example a mixture of litharge and anthraquinone.

After the pentaerythritol has all been added, the temperature should be maintained in the range of about 180°–220° C. for a period of time sufficient to remove the bulk of the water that will come off at that temperature. Subsequently the temperature may be raised in a stepwise fashion accompanied by an increase in the flow of the inert gas, to a maximum temperature in the range of about 240°–260° C. The batch should be maintained in this temperature range until the acid number of the alkyd resin is in the range of about 15–25.

When the necessary acid number has been reached, the batch temperature may be reduced slightly as, for example, to about 200° C., and the requisite amount of the aliphatic alpha, beta unsaturated (enedioic) dicarboxylic acid, anhydrides thereof, or lower alkyl esters thereof, is slowly added. These acids and anhydrides are those dibasic enedioic acids well known in the art, for example, maleic acid, fumaric acid, itaconic acid, citraconic acid, or their equivalents, the anhydrides thereof, and the lower alkyl esters thereof.

After the addition of the unsaturated dicarboxylic acid or its equivalent, the batch temperature should be raised to a temperature in the range of about 220°–240° C. and maintained at that temperature until an acid number of 20–30 is obtained. This product will be found to have a melt viscosity in the range of about 680–740 centipoises at 102° C.

Under the conditions described above, it will be found that at least about half of the rosin acids occurring in the tall oil have been esterified. In fact, one of the means of identifying the final product as being suitable for the use described is that no more than a maximum of about 20% of the original rosin acids remain unesterified; preferably the amount lies in the range of 10–20%. If a greater proportion of rosin acids than the critical 20% do remain unesterified, the product will be too brittle for the described use.

The modified alkyd resin prepared as described above may be used as a felt saturant in accordance with known procedures. The material may be put on a gray felt either by passing the felt through a bath of the molten modified alkyd resin or by the use of a reverse roller coater. As with the known oleoresinous saturants, the present saturant should be put onto the felt in an amount ranging from about 30% to about 45% by weight of the felt itself. Once the felt has been saturated with the modified alkyd resin of the present invention, the saturated felt may be cured in known ways as by stoving at a temperature of about 180° F. However, it will be found that the curing cycle involves no undesirable exothermic reaction. It will be further found that the curing cycle may be shortened to a period of about one-fourth as long as the cycle needed for the known oleoresinous resins. Whereas the oleoresinous saturants require a curing time of about 45–55 hours, the modified alkyd resin of the present invention requires a curing cycle of only 10–20 hours. The outstanding advantages of such a short curing cycle are readily apparent since four times the amount of saturated felt may be produced with equal stoving facilities.

Although the amounts of the various reactants may be varied somewhat, it is not possible to change the relative amounts to any great extent without destroying the properties of the alkyd resin. Generally speaking, the constituents will be present within the range of the following amounts:

| Reactants: | Percent of total weight |
| --- | --- |
| Tall oil | 78–88 |
| Dimerized acids | 5–15 |
| Polyhydroxy alcohol | 0.5–4 |
| Pentaerythritol | 5–15 |
| Dicarboxylic acid | 1–5 |

The litharge and anthraquinone or other suitable catalyst system are generally present in an amount of about 0.3–0.6% by weight of the total reactants and are not considered in the above listing.

In determining the amount of the particular reactant to use in accordance with the above listing, it must be kept in mind that the total number of hydroxyl groups should substantially equal the total number of carboxyl groups, except that it is normal in alkyd practice to add a slight excess of hydroxyl groups. Thus the amount of various reactants may also be expressed in terms of acid constituents and alcohol constituents as set forth in the early portion of this specification.

The following example illustrates an embodiment of the invention:

*Example*

A modified alkyd resin was prepared having the following reactants:

| Reactants | Percentage | Pounds |
| --- | --- | --- |
| Tall Oil, 38% rosin acids (Campol 8485-S) | 73.59 | 55.19 |
| Dimerized Acids (Empol 1022) | 10.51 | 7.88 |
| Diethylene Glycol | 1.86 | 1.40 |
| Pentaerythritol (Heyden's) | 10.11 | 7.58 |
| Litharge (PbO) | 0.245 | 0.184 |
| Anthraquinone | 0.169 | 0.127 |
| Maleic Anhydride | 3.51 | 2.63 |

A mixture was prepared by charging the tall oil, the dimerized acids, and the diethylene glycol to a conventional 15-gallon Blaw-Knox alkyd reactor. A gas flow of 1.2 liters per minute of dry alkyd grade carbon dioxide through a Drierite tube was passed through the mixture. The temperature of the batch was raised over the first 30 minutes to 100° C. and over the next 60 minutes to 200° C. At a total running time of approximately 90 minutes, an acid number value of 154 was obtained. At this point a dry blend of 7.58 pounds of pentaerythritol along with the lithrage and anthraquinone was added over a period of 15 to 20 minutes at such a rate that the batch temperature did not fall below 200° C.

When this addition had been completed, the gas flow was increased to 6.4 liters per minute and the temperature maintained at 200° C. for an additional 120 minutes. At this point and at a total running time of 230 minutes from the outset of the reaction, an acid number of 90 was obtained. The temperature of the batch was increased to 220° C. over an interval of the next 30 minutes and maintained at that temperature for an additional 60 minutes. At a total running time of 320 minutes, an acid number of 50 was obtained. The temperature of the batch was then increased to 250° C. over the next 30 minutes, and the gas flow was increased to 7 liters per minute. The reaction mixture was maintained under these conditions for an additional 270 minutes in order to reduce the acid number to 19 plus or minus 1. This brought the total running time of the reaction at this point to approximately 620 minutes.

The temperature of the batch was then reduced to 200° C. over a 40-minute interval, and the gas flow was reduced to 1.2 liters per minute. To the hot batch with with stirring was added the 2.63 pounds of maleic anhydride, gradually over a 15-minute period. When the addition had been completed, the temperature of the batch was increased over a 40-minute interval to 230° C. and the gas flow increased to 6.4 liters per minute. The batch temperature was maintained at 230° C. under this gas flow for an additional 120 minutes. A final acid number of 25 plus or minus 2 and a melt viscosity of 717 plus or minus 10 centipoises at 102° C. was obtained.

The saturant prepared as described was used to saturate gray felt to the extent of 36%–40% by weight of the felt. The curing cycle for the felt extended over a period of 17 hours with little indication of any exothermic reaction taking place during curing. The properties of the cured saturated felt were as good as those obtained from an oleoresinous material saturated felt.

We claim:

1. The method of preparing a modified alkyd resin which comprises reacting a mixture of tall oil, dimerized glyceride oil fatty acids, and a polyhydroxy alcohol containing at least 1 ether linkage to produce a product having an acid number in the range of about 140–160; reacting pentaerythritol with said product to produce an alkyd having an acid number in the range of about 15–25; and reacting said alkyd with an enedioic dicarboxylic acid to produce a product having an acid number in the range of about 20–30, said reactants being present in the following percentages by weight:

| Acid constituents: | Percent |
| --- | --- |
| Tall oil | 80–90 |
| Dimerized acid | 15–8 |
| Dicarboxylic acid | 5–2 |
| Alcohol constituents: | |
| Polyhydroxy alcohol containing ether linkage | 10–20 |
| Pentaerythritol | 90–80 | the ratio of the weight of said alcohol constituents to the weight of said acid constituents being such that there are substantially equal quantities of hydroxyl and carboxyl groups.

2. The method according to claim 1 wherein said dicarboxylic acid anhydride is maleic anhydride.

3. The method according to claim 2 wherein said polyhydroxy alcohol comprises diethylene glycol.

4. The method according to claim 1 wherein said step of reacting pentaerythritol is carried out at a temperature in the range of about 240°–260° C.

5. The method according to claim 1 wherein said pentaerythritol is reacted in the presence of an esterification catalyst.

6. The method of preparing a modified alkyd resin which comprises reacting a mixture of tall oil, dimerized glyceride oil fatty acids, and a polyhydroxy alcohol containing at least 1 ether linkage to produce a product having an acid number of about 154; reacting pentaerythritol with said product to produce an alkyd having an acid number of about 19; and reacting said alkyd with the anhydride of an alpha, beta, unsaturated dicarboxylic acid to produce a product having an acid number of about 25 wherein no more than about 20% of the rosin acids remains unesterified, said reactants being present within the range of the following percentages by weight:

| Reactants: | Percent of total weight |
|---|---|
| Tall oil | 78–88 |
| Dimerized acids | 5–15 |
| Polyhydroxy alcohol containing ether linkage | 0.5–4 |
| Pentaerythritol | 5–15 |
| Dicarboxylic acid anhydride | 1–5 | wherein the hydroxyl and carboxyl groups are present in substantially equal quantities.

7. The product made according to claim 1.

8. The product made according to claim 3.

References Cited in the file of this patent

UNITED STATES PATENTS 1,900,638 Ellis _____ Mar. 7, 1933
2,611,756 Pockel _____ Sept. 23, 1952

OTHER REFERENCES

Moore: Paint Oil and Chem. Review, Jan. 4, 1951, pp. 13, 14, 16, 26, 28 and 29.

Ford et al.: Paint Oil and Chem. Review, Aug. 14, 1952, pp. 14, 48, 52.